(12) United States Patent
West

(10) Patent No.: US 11,303,243 B2
(45) Date of Patent: Apr. 12, 2022

(54) SYSTEMS AND METHODS FOR CONSTRUCTING SOLAR POWER PLANTS WITH ELECTRIFIED HEAVY EQUIPMENT

(71) Applicant: Ojjo, Inc., San Rafael, CA (US)

(72) Inventor: Jack West, San Rafael, CA (US)

(73) Assignee: Ojjo, Inc., San Raefael, CA (US)

( * ) Notice: Subject to any disclaimer, the term of this patent is extended or adjusted under 35 U.S.C. 154(b) by 2 days.

(21) Appl. No.: 17/062,868

(22) Filed: Oct. 5, 2020

(65) Prior Publication Data
US 2021/0104904 A1    Apr. 8, 2021

Related U.S. Application Data

(60) Provisional application No. 62/909,968, filed on Oct. 3, 2019.

(51) Int. Cl.
*H02S 10/00* (2014.01)
*H02J 7/02* (2016.01)
*B60L 53/30* (2019.01)
*B60L 53/51* (2019.01)

(52) U.S. Cl.
CPC .............. *H02S 10/00* (2013.01); *B60L 53/30* (2019.02); *B60L 53/51* (2019.02); *H02J 7/02* (2013.01)

(58) Field of Classification Search
CPC ....................................................... H02S 10/00
USPC ......................................................... 320/109
See application file for complete search history.

(56) References Cited

U.S. PATENT DOCUMENTS

| | | | | |
|---|---|---|---|---|
| 2009/0276993 A1* | 11/2009 | Fedock | ................... | E04H 12/34 29/429 |
| 2010/0279455 A1* | 11/2010 | Seemann | ............... | G06Q 10/04 438/73 |
| 2012/0279069 A1* | 11/2012 | Von Deylen | ............ | F24S 25/61 29/890.033 |
| 2013/0269181 A1* | 10/2013 | McBride | ................. | H02S 40/00 29/825 |
| 2014/0145059 A1* | 5/2014 | Anderson | ............... | F24S 25/00 248/550 |
| 2014/0319439 A1* | 10/2014 | Jordan | ..................... | B66D 3/04 254/334 |
| 2014/0360552 A1* | 12/2014 | Britcher | ................. | H01L 31/18 136/244 |
| 2015/0377516 A1* | 12/2015 | Nielsen | ................... | F24S 25/10 126/693 |
| 2016/0065121 A1* | 3/2016 | Bugg | ....................... | H01L 31/02 29/525.08 |
| 2017/0137238 A1* | 5/2017 | Kamata | ................. | B60P 1/5485 |
| 2017/0282733 A1* | 10/2017 | Ito | ........................... | B60L 53/51 |
| 2019/0134822 A1* | 5/2019 | Clemenzi | ............... | H02S 99/00 |
| 2019/0251208 A1* | 8/2019 | Tamasato | ............... | H02S 10/00 |

(Continued)

*Primary Examiner* — Jerry D Robbins
(74) *Attorney, Agent, or Firm* — Phillip D. Mancini

(57) ABSTRACT

A solar power plant is constructed using a reverse workflow whereby the grid connection that will ultimately feed electricity to the grid is constructed before the array so that one or more transformers and portable charging stations may be deployed onsite to transform grid power so that it can recharge electrically powered heavy equipment including solar pile drivers, truss drivers, and telehandlers as well as electrically powered hand tools such as cordless impact drivers while the plant is constructed. Once complete, the fixed electrical infrastructure and grid connection are used to supply power from the solar power plant to the grid.

10 Claims, 6 Drawing Sheets

(56) References Cited

U.S. PATENT DOCUMENTS

2020/0412295 A1\* 12/2020 Miller .................... H02S 10/00
2021/0226575 A1\* 7/2021 Tyler ..................... H02S 20/10

\* cited by examiner

SYSTEMS AND METHODS FOR CONSTRUCTING SOLAR POWER PLANTS WITH ELECTRIFIED HEAVY EQUIPMENT

CROSS-REFERENCE TO RELATED APPLICATIONS

This claims priority to U.S. provisional patent application No. 62/909,968 filed on Oct. 3, 2019, titled "SYSTEMS AND METHODS FOR CONSTRUCTING A UTILITY-SCALE SOLAR ARRAY WITH ELECTRIFIED EQUIPMENT", the disclosure of which is hereby incorporated by reference in its entirety.

BACKGROUND

The falling price of solar panels and increased awareness of the importance of moving from fossil fuel-based power sources to clean, renewable ones, among other factors, have led to a boom in utility-scale solar development projects in the United States and around the world. This is especially true in warm, sunny states like California, Texas, and Arizona, but is also true in mid-Atlantic states like North Carolina and Tennessee and even in Northern and mid-Western states not typically thought to be suitable for solar.

Although this trend will reduce $CO_2$ emissions over the long term, utility-scale solar arrays are constructed using legacy diesel-powered equipment that is highly pollutive. According to the United States EPA Clean Air Act Advisory Committee, construction equipment is one of the leading causes of air pollution because this off-road equipment emits large amounts of carcinogens, smog-forming compounds, and soot. A single piece of equipment can emit as much particulate matter as more than 500 automobiles. Therefore, in the short term, solar development may have the undesirable effect of increasing air pollution. Also, besides labor, fuel is one of the largest sources of on-site costs. The average fuel consumption of heavy equipment can range from 3-4 gallons per hour up to 12+ gallons per hour depending on size, weight, and application. At a per gallon rate of more than $3.00 at today's prices, that equates to as much one thousand dollars ($1,000) per 8-hour day in fuel costs.

One reason diesel continues to dominate the construction industry, even for clean energy projects, is that it is reliable, readily available, generates high output power needed to drive hydraulic actuators and heavy machinery, and, although more pollutive, is more efficient than gasoline. Electric motors can do the work of diesel engines but until recently, the cost per unit of power was too high relative to diesel to be competitive. Also, electric-powered vehicles (EVs) require batteries to store energy so that equipment can be operated without a tether to power. Although batteries are common for small tools (e.g., hand-held drills, impact drivers, saws, etc.), until recently, they have been too expensive to be used in heavy equipment. In 2010, when electric vehicles first hit the market in commercial quantities, the batteries that powered them were on the order of $1200 per kWh. However, subsequent investments in battery manufacturing capacity and improvements in power density and chemistry, led by the proliferation of electric vehicles, have driven that cost down to about $200 per kWh with a goal of closer to $100 per kWh. This massive reduction in costs has made it economically feasible to consider replacing diesel-engines with electric motors to power some heavy equipment. As evidence of this, in late 2017, EV-maker TELSA, INC. of Palo Alto, Calif. unveiled an electric semi-truck with a range of up to 500 miles that costs the same or less than an equivalent diesel semi but with much lower operating costs and zero emissions. It achieves this with an onboard battery pack sized between 400 kWh and 700 kWh. At $200 per kWh, a battery pack of that size costs between $80 k and $140 k making it only somewhat more expensive than a large diesel motor with the required pollution control and cooling systems. However, the reduced operating costs should negate the upfront price delta and will actually cost less over the lifetime of the vehicle.

Although diesel is more energy dense than batteries, the disparity is not so large as to make it unfeasible. A gallon of diesel produces the equivalent of 40-kWh of energy. However, because the diesel engine, like other internal combustion engines, is only about 40% efficient that number drops to 16-kWh of energy per gallon. The other 60% of energy is given off as heat, mostly through the tail pipe. Therefore, only a 160-kWh battery is required to replace the energy density of 10-gallons of diesel fuel. Therefore, to have the power equivalent of a 30-gallon diesel tank requires a 480-kWh battery pack. Smaller equipment will have a tank much smaller than 30-gallons. At today's prices, such a battery pack would cost about $96 k or $32,000 for every 10-gallon equivalent. On a $250 k-500 k piece of equipment, that cost is reasonable since it would be offset by the absence of diesel-related equipment. A 480-kWh battery would likely weigh in excess of 10,000-pounds, however, the battery packs could be located in the spaced surrounded by the tracks to add stability to the machine. Some equipment makers actually add weights to the chassis to make them more stable, so heavy batteries could eliminate some of the need to do that.

In addition to batteries, EVs also require onsite or proximate connections to power for recharging. On utility-scale solar construction projects, power is not typically present until the last phase of construction when the system is ready to be interfaced to the grid. Mobile diesel generates are usually used to provide portable power. Even, then, the persistent onsite power demands are relatively low, for example, to power lights, security systems, sensors and tracker drive motors, and other low power devices and systems. Even though these projects are may be built within a few miles of high voltage transmission lines, they are often built on previously undeveloped land that lacks an active grid connection. Also, because the grid interconnection requires the utility, this is typically not done until the array is completely operational. Therefore, changes must be made to the standard project workflow to ensure that this necessary infrastructure in in place early on to enable electrically powered equipment to be used. To that end, the various embodiments of this disclosure are directed to systems and methods for developing a job site to maximize the ability to use electric powered equipment when constructing utility-scale solar trackers and other solar arrays while minimizing construction redundancies.

DETAILED DESCRIPTION

Figure 1:
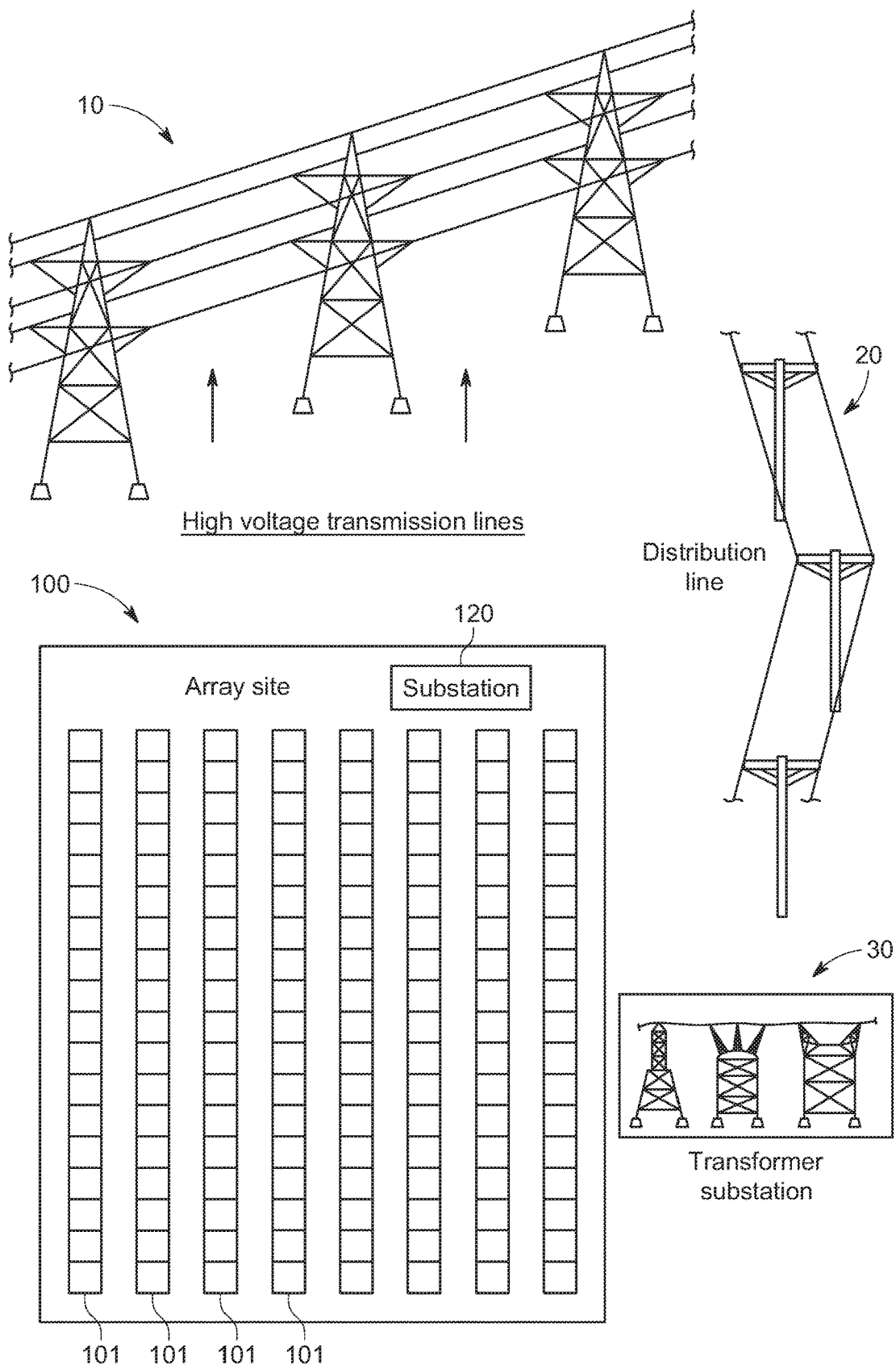
FIG. 1 shows a utility-scale solar power plant and grid elements required to feed and distribute power generated by such a power plant.

The following description is intended to convey a thorough understanding of the embodiments described by providing a number of specific embodiments and details involving constructing fixed-tilt and single-axis tracker solar power plants. It should be appreciated, however, that the present invention is not limited to these specific embodiments and details, which are exemplary only. Various embodiments of the invention may be equally useful for developing polar-axis trackers, concentrated solar power arrays (CSP), and dual axis trackers among other types of clean energy power plants. It is further understood that one possessing ordinary skill in the art in light of known systems and methods, would appreciate the use of the invention for its intended purpose.

As noted in the background, development of solar and in particular single-axis trackers is growing rapidly in the United State and abroad. Because solar currently accounts for less than 2% of all energy generated in the United States, it has a lot of room to run before running up against renewable energy targets of 25-35% announced by several states. Therefore, as solar continues this rapid growth trajectory, there is a need to decouple the increase in activity from the generation of pollution usually associated with large-scale construction projects.

Utility-scale solar development projects are forward-looking deals and may even be signed and even sold in the secondary market years before ground is broken at the array site. The first phase of project development is dedicated to securing land rights, executing contracts for construction, hardware, and the purchase of the generated power, and to obtaining project financing. After all those elements are all in place, the array eventually gets built. The first onsite step is usually to perform a survey of the site. The survey will determine the precise dimensions of the array and is used to create a hardware-specific development plan specifying what system will be used and where each row of will extend and even where each foundation ground penetration will occur. Then, if needed, the site must be prepped by leveling or scraping the ground, clearing brush, and/or removing surface rocks, stumps, or other interfering objects. Once the site is prepped, construction may begin. This usually starts with the foundation contractor installing the components that will anchor the array to the ground. Foundation work is followed by onsite electrical work (e.g., trenching, conduit, and running conductors from row-to-row or across rows as necessary) for aggregating power generated by the system, supplying power to drive motors and to other components and systems. In parallel, or just after this activity, the tracker or fixed-tilt array components are installed. This includes bearing assemblies, torque tubes, dampers, motors, drive assemblies, purlins, etc. Next, the panel installer attaches thousands of solar panels to the torque tubes or other support structure to complete the array and interconnects each panel electrically to form high voltage DC strings. The high voltage strings are in turn connected to inverters that convert the direct current power generated by the panels to alternating current for transmission. The output of these inverters is aggregated onsite at a substation. At some point after the foundation is installed, an electrical contractor makes a connection to the local power grid between the output of the equipment in the substation (combiner boxes, transformers, voltage regulators, etc.) and the grid. The equipment in the substation normalizes the array's output to match the characteristics of the proximate power grid.

Although heavy equipment is used throughout the process, there are some differences between the equipment used in each phase that make some machines more compatible with electric power than others. In the initial phase, large, heavy earth moving tools are used for site preparation. These include general purpose construction equipment like bulldozers, motor graters, scrapers, large wheeled loaders, and large excavators. Due to their size and weight and the fact that they are also used in many other non-solar applications where electric power may not be available, this type of heavy-duty equipment is not yet suitable to run on electric power until electric infrastructure evolves to the point where batteries become much cheaper and access to charging is ubiquitous.

Figure 2:
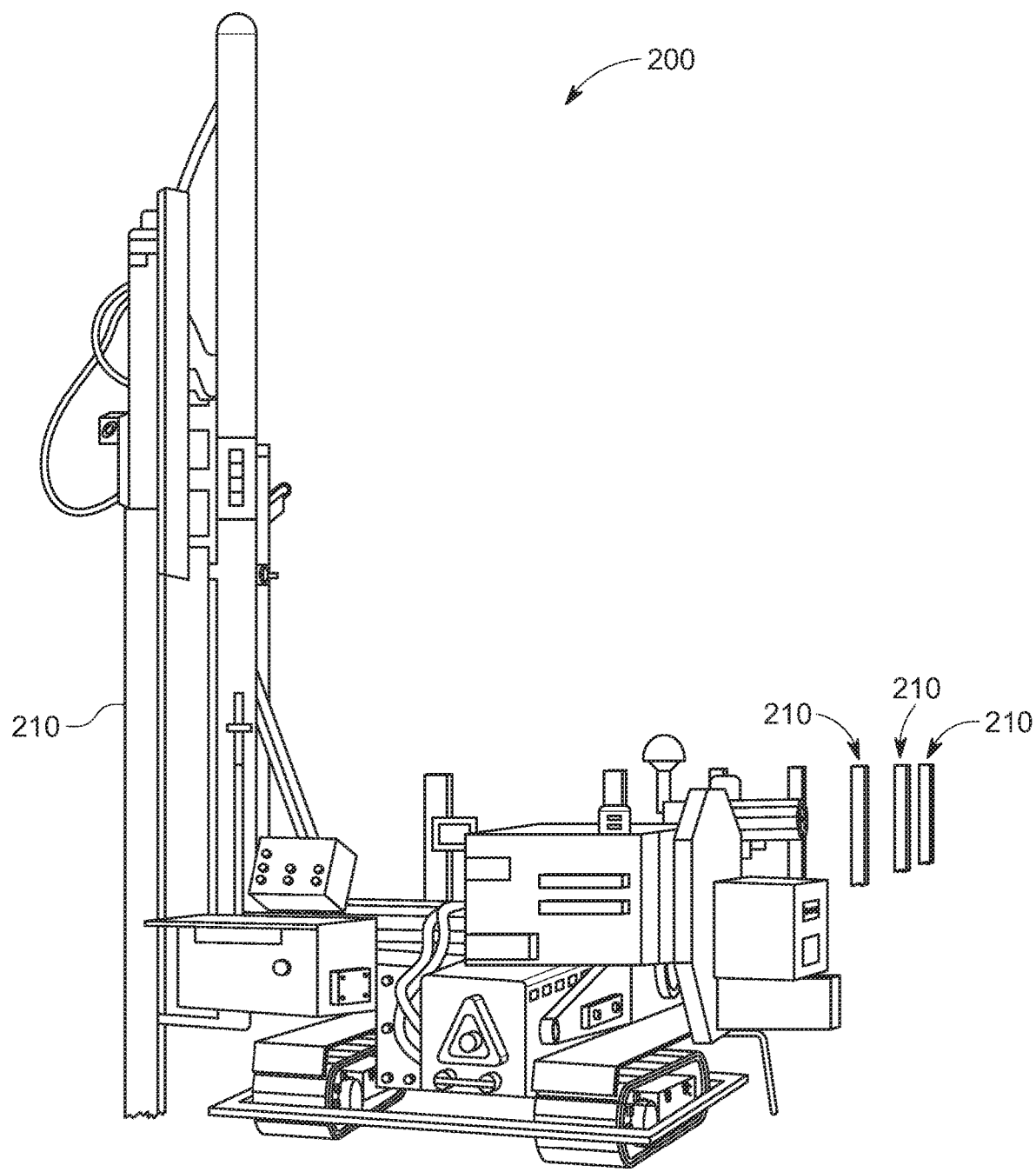
FIG. 2 shows a solar pile driving machine being used to install rows of H-piles on a single-axis tracker array site.

The equipment used in next phase of construction, however, tends to be lighter in weight, more specialized in function, and in some cases, even specific to the type of foundation selected for the project. Until recently, solar pile drivers were the dominant machine used to build tracker foundations. These include purpose-built machines from Gayk of Ozark, Mo., Turchi USA of Amarillo, Tex., Pauselli Group of Citta di Catello, Italy, and Vermeer of Pella, Iowa, among many others. Solar pile drivers are small to medium-sized tracked machines with a vertical driving mast extending from one side that holds an H-pile or I-beam at a plumb orientation above the penetration point location and hammers the head of it to drive it into the ground. Exemplary solar pile driver 200 is shown in in FIG. 2. In this figure, driver 200 is being used to install rows of piles 210, spaced apart according to the site plan for the array. In a large tracker array, several hundred H-piles must be driven for every megawatt of power generating capacity requiring the machines to be used essentially non-stop each day until all the piles have been driven.

Figure 3:
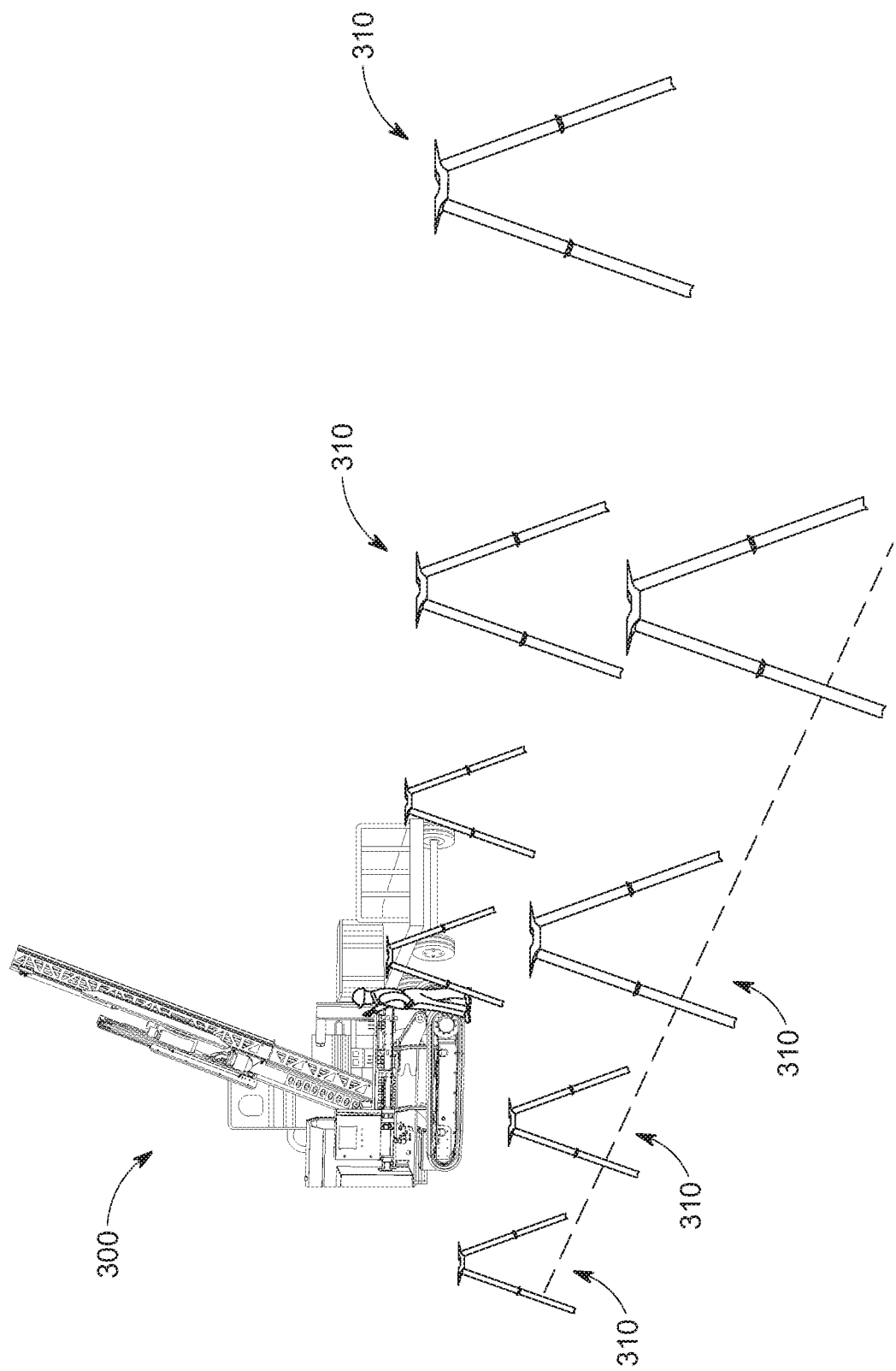
FIG. 3 shows a truss driver machine being used to install and assemble rows of truss foundations on a single-axis tracker array site.

In 2019, the applicant of this disclosure publicly introduced an alternative to plumb-driven H-pile foundations that relies on an A-frame shaped truss structure formed from a pair of adjacent sloped legs. The system is sold commercially as EARTH TRUSS. In the EARTH TRUSS system, each leg is formed from a below-ground screw anchor and an above-ground upper portion. The above ground ends of adjacent legs are joined together with a bearing adapter, bearing support or other structure. The screw anchors connecting the foundation to the ground are driven in adjacent pairs straddling the intended North-South line of each tracker row. The machine used to drive the screw anchor pairs is called the Truss Driver. An exemplary truss driver 300 is shown in FIG. 3. Like solar pile driver 200 in FIG. 2, Truss Driver 300 travels on a tracked chassis with an articulating driving mast, however, instead of beating piles into the ground, the Truss Driver drives screw anchors into the ground with a combination of rotation and downforce. The Truss Driver also provides an independently controlled tool driver positioned on the mast above the rotary driver that can actuate tools (e.g., drill, mandrel, etc.) in-situ, that is, through the rotary driver and screw anchor, to assist driving and prevent refusals. The mast is self-leveling (pitch) and can be aligned in the X, Y, and Z-directions as well as roll and yaw relative to the machine so that each successive pair of legs in a row points at a common work point. The mast is attached to the machine via a rotating support that allows it to drive adjacent screw anchors at different angles without changing planes or needing to move the machine. In addition to driving, the truss driver machine orients and holds the truss apex component in place while leg connections are made to form truss foundations 310.

It should be appreciated that the various embodiments of the invention are agnostic as to the specific type of foundation machine used to construct the single-axis tracker. The various embodiments are compatible with both solar pile drivers and Truss Drivers, as well as compact excavators, forklifts, telehandlers, skid-steer loaders, and/or UTVs, all of which may be used during construction of the foundation as well as in later stages of tracker construction. Given their size and duty, all of these machines are well-suited to run on electric power.

As discussed in the background, ignoring the fact that batteries and electric motors cost more than equivalent diesel power systems, construction sites in general can be expansive, away from other infrastructure, and may not have sufficient or even any connection to power that could support electric vehicles. Constructing a transformer station and grid connection for such projects may not be feasible because the projects themselves do not need such a high voltage and current connection to grid. However, unlike other construction projects, solar development projects present a unique opportunity to use electrically powered equipment. Utility-scale tracker arrays require a high voltage grid connection because they generate large amounts of power that in most cases is not consumed onsite. Therefore, before an array can become functional, a high voltage/high current metered connection to the grid must be established. One single-axis tracker array may include several hundred megawatts of power generating capacity and will supply 3-4× that amount in electric power to the grid each day. This power must be transformed in phase and voltage to enable it to be fed to the grid, requiring transformers, metering, and shut-off equipment typically not needed at other commercial sites that merely draw power from the grid. That equipment is typically housed within a fenced-in or walled enclosure referred to generally as a substation.

Turning now to FIG. 1, this figure shows a utility-scale solar power plant and grid elements typically required to feed and distribute the power generated by the power plant. For ease of illustration, the exemplary array 100 shown here consists of eight rows 101. In real world applications, there may be dozens to hundreds of rows on a single array site. In this example, each tracker row consists of individual solar panels in portrait orientation. The panels are electrically connected to one another to form high voltage strings and the output of these strings are connected to inverters that convert the power from direct current to alternating current. The alternating current outputs of the inverters are also combined at and then fed into one or more transformers located in an onsite substation 120 that is connected to the power grid. The output of substation 120 may run along local above ground or underground distribution lines 20 until it reaches a grid transformer substation 30 where it may be stepped up even further so that it can be fed into high voltage transmission lines used to transmit power over long distances. Alternatively, it may be fed directly into transmission lines that distribute power to end-user customers. In the United States, high voltage power transmission lines such as lines 10 are operated at 345,000V. These lines are used to transmit power over many piles. Sub-transmission lines are used to distribute power from high-voltage power lines with a line voltage of 69,000V, while local transmission lines are typically carrying power at 13,800V. Therefore, some degree of onsite voltage transformation is usually required at a solar power plant site to enable power to flow into the grid.

Figure 4:
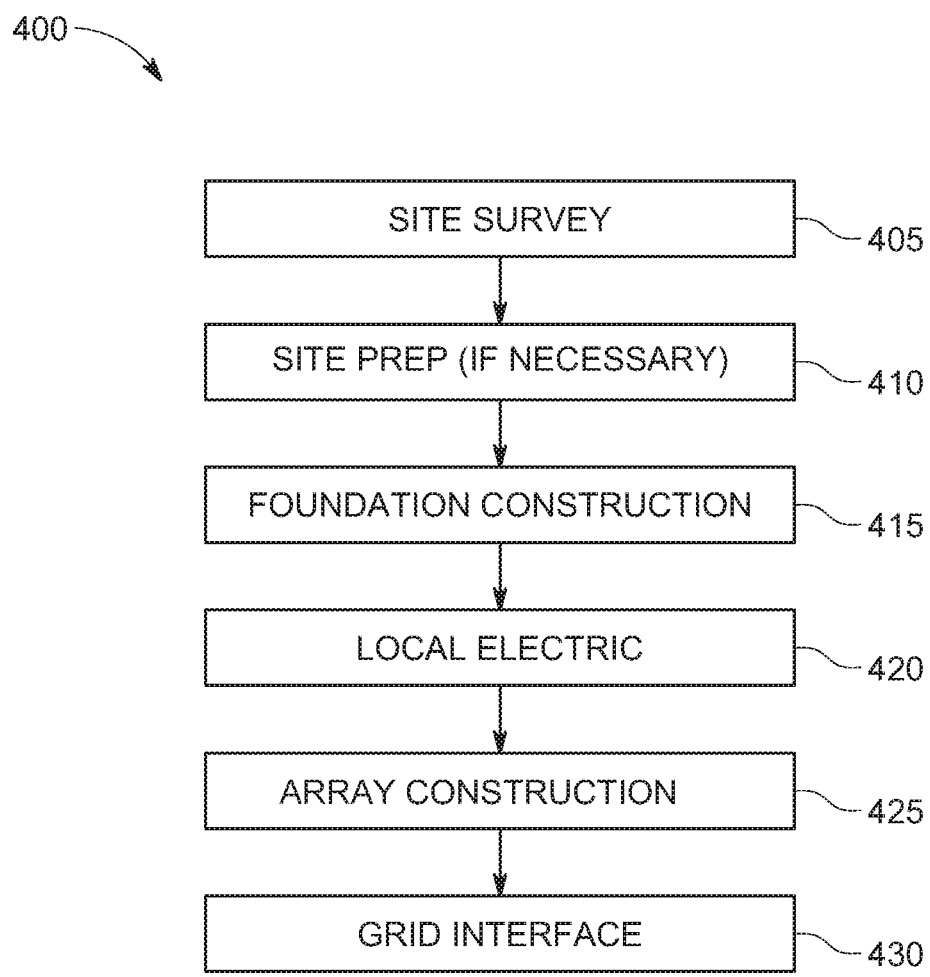
FIG. 4 is a flow chart detailing the steps of a conventional method for developing and constructing a solar power plant.

FIG. 4 is a flow chart detailing the steps of method 400 of developing and constructing a utility-scale solar array according to the prior art. Exemplary method 400 begins in step 405 where a site survey of the property is performed to determine the property boundaries and how and where the array will be distributed within those boundaries with a particular tracker maker's product in mind. The site survey may involve one or more surveyors walking the site and taking measurements that enable a layout of the proposed array site to be prepared. More recently, drones have been employed to fly around the array site and make a 3-dimensional surface map of the site which can then be converted in software to a site plan. In step 410, any required site preparation must be performed. This may include road building, leveling, scraping, grading, perimeter fencing, removing rocks or stumps, and/or any other impediments to construction of the array. Once the site is prepped, construction of the array begins in earnest with the foundation in step 415.

As discussed above, for a single-axis tracker array, the foundation may consist of rows of H-piles driven with a pile driver, or alternatively, rows of A-frame shaped trusses formed from embedded screw anchors driven with a Truss Driver machine. For a fixed-tilt array this may comprise driving single screw anchors or H-piles into the ground or parallel rows of these components. In either case, the resulting structure is ready to receive the components of the particular tracker or fixed-tilt system chosen for the project. After the foundations are in place, in step 420, onsite electrical work is performed. This may include trenching to run conduit between rows, such as at the end of each row or across the middle of each row and electrical hook-ups for inverters, drive motors and other powered components.

Next, in step 425 the array is constructed. In the case of a single-axis tracker, this includes installing bearing components if not already included in the foundation, placing torque tube sections in the bearings, connecting drive motors or drive assemblies, powering the drive motors, and installing mechanical dampers. In the case of a fixed-tilt array, this consists of attaching the above ground components that will support the solar panels. Array construction is completed by attaching solar panels to the torque tube and/or purlins and serially connecting each panel to the adjacent one to create high voltage strings that are in turn connected to inverters. One or more inverters may support each row. The inverters may be attached to the tracker itself or housed in the substation or in another enclosure onsite.

The last step of the construction process, step 430, is to interconnect the output of the now functional array to the grid. This may include building a substation and tying into the closest utility grid via adjacent utility poles or burying cable underground to reach the closest grid substation and/or high voltage transmission lines. Because grid connections require utility approval, this is usually not done until construction is complete and the array is ready to come online. However, if the grid connection is merely to enable power to be drawn from the grid, rather than feeding power into it, this staging requirement may be eliminated.

To take advantage of the unique electrical infrastructure required to operate a utility-scale solar development project, various embodiments of the invention provide a portable transformer station that, for example, can travel in one or more shipping contains or that can fit on one or more towable trailers. This is shown with reference to FIG. 5 which shows a portion of solar array construction site 500 including portable electrical equipment required to establish a grid connection according to various embodiments of the invention Array site 500 in FIG. 5 includes onsite fixed infrastructure 515 which makes the connection to and from the adjacent power grid. In various embodiments, this fixed infrastructure includes electrical components necessary to step up and/or step-down power from the grid. In various embodiments, an electric meter 520 is added to enable an accounting of power consumed on site as well as power that will be uploaded to the grid by the array once operational. Though not shown, a bypass switch may be added on the load side of the meter to separate power coming from the grid from power flowing into it.

Figure 5:
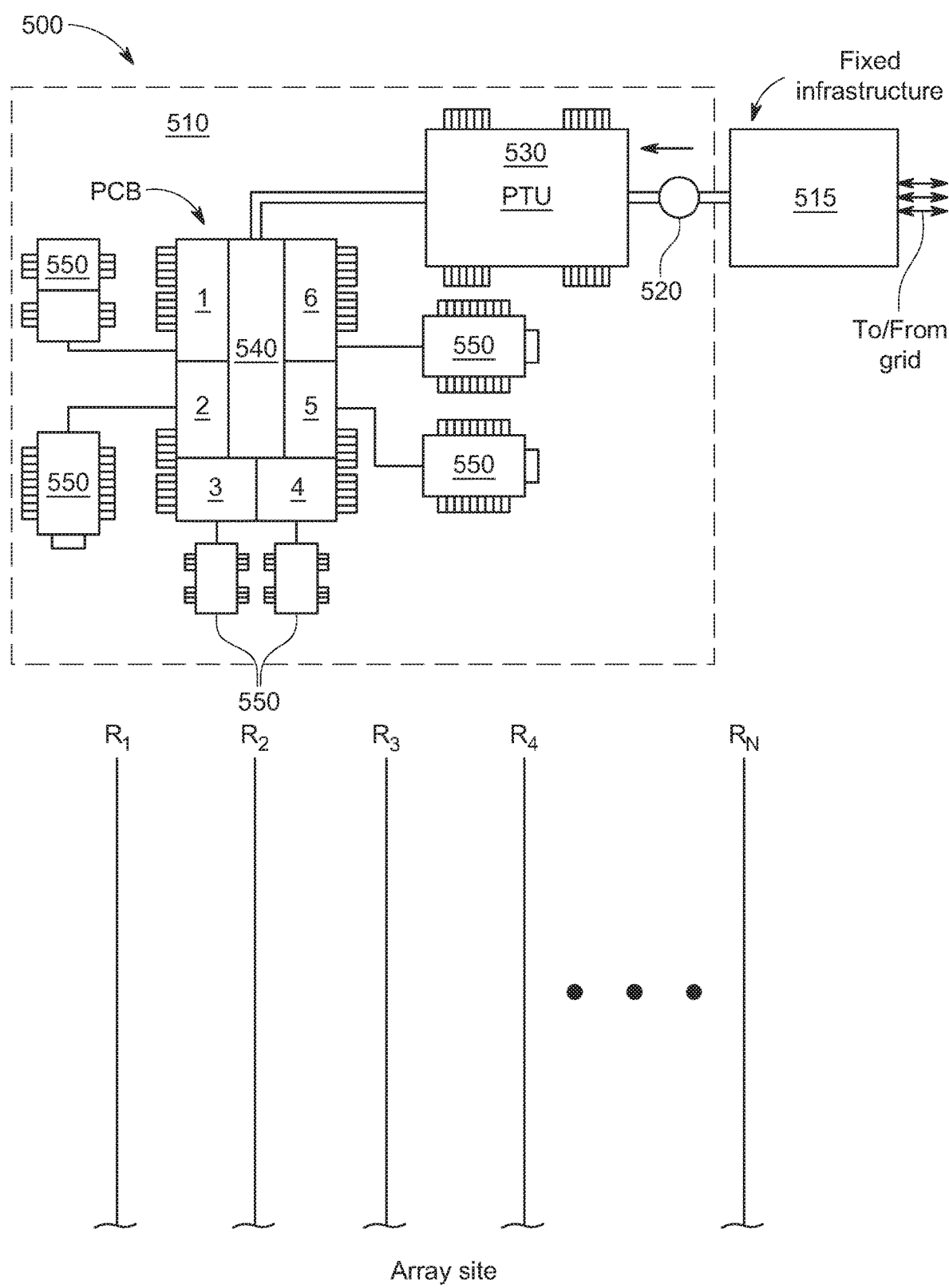
FIG. 5 shows a portion of a solar array construction site including portable electrical equipment required to establish a grid connection according to various embodiments of the invention.

In order to enable electrically powered equipment to be used, in many cases it will be necessary to bring portable equipment to the job site to facilitate bucking down and conditioning the voltage and current to usable levels for equipment on site. Because these functions are specific to providing charging, in most cases they will not be needed once the array is functional, so they are excluded from fixed infrastructure 515 and instead made portable to enable them to be taken away when construction is complete and taken to future array construction projects. In the example of FIG. 5, this equipment includes portable transformer unit 530 (labeled PTU) and portable charging bank 540 (labeled PTB). In various embodiments, this equipment is positioned in area 510 proximate to the array's substation building or fixed infrastructure 515. In various embodiments, PTU 530 is a self-contained unit that includes the necessary transformer equipment to take power from the substation's high voltage grid connection and to step it down to the correct voltage and current to charge EVs—typically under 1000 volts. In various embodiments, PTU 530 will tap into substation's grid connection. In other embodiments, the substation may provide some level of buck or boost of the voltage coming from the grid depending on the grid's voltage proximate to the array. In various embodiments, a meter such as meter 520 may be placed between PTU 530 and the fixed infrastructure 515 so that an accounting can be made of all power consumed through PTO 530. In other embodiments, a two-way meter that will be used to meter power produced at the jobsite will be installed and PTU 530 will be connected to the load side of that meter. After PTU 530 has been grid-connected through fixed infrastructure 515, a portable charging bank or PCB 540 may be located proximate to PTU 530. One or more electrical connections are made between PCB 540 and the output of PTU 530 via a flexible line or within conduit. In various embodiments, PCB 540 may provide level 2 charging at 240V, level 3 charging at 480V or even higher voltage charging. Various ones of the individual chargers may operate at level 2 while others may operate at level 3 or above. Exemplary PCB 540 shown in FIG. 5 has 6 individual charging stations, however, fewer, or more may be present. As array site 500 is being constructed, equipment 550 may be selectably coupled to PCB 540 for recharging, such as, during lunch breaks, overnight and during periods of non-use. When construction of the array is complete, the connection between PTU 530 and the grid may be severed and PCB 540 and PTU 530 taken to the next job site along with battery powered equipment 550. In various embodiments, the PCB may also have standard 120V or 240V outlets to recharge hand tools, security lights, to provide plugs for electrical tools without batteries, and/or to power a sub-circuit for a climate-controlled trailer or other current drawing device or system.

Figure 6:
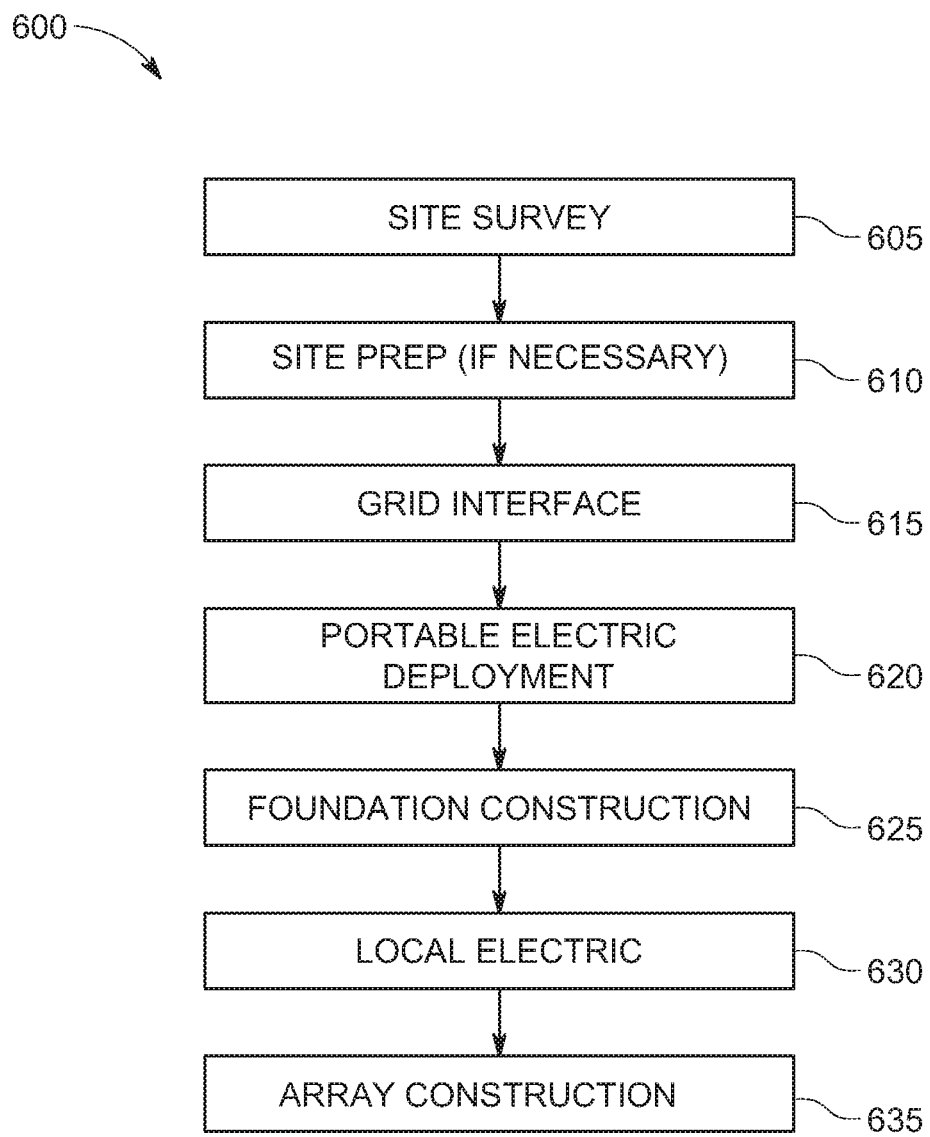
FIG. 6 is a flow chart detailing the steps of a method for developing and constructing a solar power plant with electrified heavy equipment according to various embodiments of the invention.

Turning now to FIG. 6, this figure shows a flow chart detailing the steps of method 600 for constructing a single-axis solar array that allows the use of electrified vehicles and equipment according to various embodiments of the invention. The method again begins in step 605 with a survey of the site. This may be done manually with conventional surveying equipment or done in a more automated fashion such as by flying a drone as discussed above. Next, in step 610, any necessary site preparation is performed and perimeter fencing constructed. As discussed above, the heavy, general purpose equipment used in this phase is less well-suited for electric power. Next, however, instead of proceeding with foundation construction, in step 615, connection is made to the closest power transmission lines that will eventually receive the output of the array. This may require burying utility lines to bridge the gap between the grid and the array site, stringing lines from nearby transmission lines along utility poles, or a combination of these. This may also require constructing the electrical substation or fixed infrastructure at the array site that will ultimately house the transformers, voltage regulators, combiner boxes, switches and other components that will condition and interface the electrical output of the array to the grid. In various embodiments, this may include installing a bypass switch to separate power being consumed from power being generated. A power meter may be installed on the grid side of the bypass switch. In various embodiments, the meter will operate in both directions to enable an accounting of power consumed onsite during construction and as well as to measure power supplied by the array to the grid once the array is operational. Alternatively, a separate meter may be installed downstream from the bypass switch. A metered-load drawing connection to the grid is usually more quickly approved by the utility than a supply connection so this step will take less time than bringing the array online post construction. The meter may be part of PTU 530.

After the metered connection has been made to the grid, next, in step 620, portable electric equipment to be used in the subsequent phases of construction is deployed to the array site. In various embodiments, at least two portable elements are needed to interface the metered grid connection to EV's used on the job site: (1) a portable transformer unit (PTU 530) that converts the incoming grid power on the array side of the meter to voltage and current levels that are appropriate to feed the EV chargers, and (2) one or more portable banks of EV chargers (PCB 540) spaced apart sufficiently far to allow multiple pieces of electrified equipment to charge simultaneously. As noted above, the PTU may be part of a dedicated truck or trailer or may reside in a shipping container that is craned onsite or pulled on a towable platform that can simple be delivered to the array site and parked proximate to the metered grid connection. Because the installation is temporary and, on a construction site, it may be possible to use insulated heavy-duty cables that rest on the ground to connect the PTU to the meter without needing to bury cables or use rigid conduit between them. Moreover, the trailer or other portable structure may include one or more ground rods to provide an Earth ground. It may be necessary to construct a temporary fence around the PTU for safety reasons and to conceal the power wires depending on the configuration and applicable electric codes.

Similarly, the portable charging bank (PCB 540) may also be towable, such as on a trailer or other portable structure that can be brought to the array site and parked proximate to the PTU or craned off of a truck. As shown, the PCB 540 has six individual charging stations, however, fewer, or more may be included. The PCB may also provide multiple 120V outlets for recharging battery-operated tools and one or more 240V outlets for powering a small construction trailer or other equipment without needing a portable generator. Each charging station may have multiple J1772 connector coupled to a standard 25-foot cable or high voltage, level three charging connectors. It should be appreciated that although the PTU 530 and PCB 540 have been described and shown as separate portable equipment, their functionality may be combined into a single piece of portable equipment. Such modifications are within the scope of the invention.

Once the metered grid interface, PTU and PCB are in place, battery powered heavy equipment may be trucked to the job site. If the equipment is brought using an electric vehicle, the vehicle may be re-charged using one or more of the portable charging stations of the PCB. In various embodiments, the EVs will have a sufficiently large battery to enable them to be operated for several hours on a single charge. In various embodiments, the portable charger bank may include one or more high voltage so-called "Super Chargers" or "Mega Chargers" that deliver more than 100 kW of power up to 1000 kW or more of power to charge a multi-hundred kW EV battery to near full charge in a short amount of time (e.g., 30 minutes). This will enable mid-day charging to occur over lunch breaks to top off the battery for use in the afternoon. The EVs may be any number of devices that are used on a solar construction site after site preparation is completed, including an excavator, backhoe, off-road forklift, reach forklift or telehandler, solar pile driver, Truss Driver, utility task vehicle (UTV), skid-steer, or other suitable equipment. At night when there is no activity on the site, the equipment can be tethered to one of the charging connectors of the PCB to recharge their batteries.

Next, in step 625, with all equipment and charging infrastructure in place, construction of the foundations may begin. As discussed herein, this may involve driving H-piles in North-South rows with a vibratory or impacting pile driver or constructing truss foundations from screw anchors and above-ground components with a truss driver, or still other construction steps. In parallel to this, or just after, in step 630 local electrical work is performed. This may include digging trenches, running conduit and placement and construction of the onsite substation including connection to the transfer switch that provide power to the grid through the meter.

Finally, in step 635, the array is constructed. Once complete, the portable electrical equipment such as the PCB and PTU may be removed and the combined output of the operational array pass through the onsite substation, transfer switch, and metered connection to the grid.

With the disclosed systems and methods, construction-related pollution may be decoupled from the rapid increase in solar array construction. The embodiments of the present inventions are not to be limited in scope by the specific embodiments described herein. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A method of developing a solar power plant with electrified heavy equipment comprising the steps of:
   constructing a transformer substation at a solar array site;
   establishing a metered connection to an electrical grid through the substation;
   positioning a portable transformer unit proximate to the substation and electrically coupling the portable transformer unit to the grid via the substation through the meter;
   positioning a portable EV charging bank to the portable transformer unit; and
   electrically coupling the charging bank to the portable transformer unit so that electrical power may be drawn from the electrical grid through the substation and meter to recharge at least one piece of electrified heavy equipment at the array site.

2. The method according to claim 1, wherein the at least one piece of electrified heavy equipment is selected from the group consisting of a pile driver, a truss driver, and a telehandler.

3. The method according to claim 1, further comprising, constructing at least a portion of the solar power plant with the at least one piece of electrified heavy equipment and connecting the output of the array to the grid through the meter via the substation.

4. A system for recharging electric vehicles at a utility-scale solar development site comprising:
   a portable charging bank;
   a portable transformer unit; and
   an electrical meter, the electrical meter connected to the portable transformer unit on the load side and to a grid-connected substation of the utility-scale solar array on the supply side, wherein the portable charging bank includes a plurality of EV chargers for charging EVs at the development site with power supplied by grid-connected substation via the portable transformer unit.

5. The system according to claim 4, wherein the EVs are selected from the group consisting of a pile driver, a truss driver, and a telehandler.

6. The system according to claim 4, wherein the portable charging bank and portable transformer unit are on a common mobile platform.

7. The system according to claim 4, wherein the electrical meter and substation are operable to take power from the grid and to supply power from the array to the grid.

8. On a jobsite of a utility-scale solar power plant after site preparation has occurred, a method of constructing the solar power plant with electrified equipment comprising the steps of:
   constructing an electrical substation at the array site;
   establishing a metered electrical connection between the substation and an electrical grid;
   locating a portable transformer unit proximate to the substation and electrically coupling the portable transformer unit to the substation through the metered electrical connection;

locating a portable EV charging bank proximate to the portable transformer unit; and electrically coupling the charging bank to the portable transformer unit so that electrical power may be drawn from the electrical grid through the metered electrical connection by chargers of the charging bank to recharge at least one EV.

9. The method according to claim 8, wherein the at least one EV is an EV selected from the group consisting of a pile driver, a truss driver, and a telehandler.

10. The method according to claim 8, further comprising, constructing the utility-scale solar array with the at least one EV and connecting the output of the array to the grid through the meter via the substation.

\* \* \* \* \*